Patented Oct. 31, 1939

2,177,943

UNITED STATES PATENT OFFICE 2,177,943

CERAMIC BODY FOR SPARK PLUG INSULATORS

Taine G. McDougal, Albra H. Fessler, and Helen Blair Barlett, Flint, Mich., assignors to General Motors Corporation, Detroit, Mich., a corporation of Delaware No Drawing. Application September 7, 1938, Serial No. 228,820

2 Claims. (Cl. 106—12)

This is a continuation in part of our prior application Serial No. 50,243 filed November 16, 1935.

This invention has to do with ceramic bodies especially adapted for use as spark plug insulators. We have found that compositions consisting principally of aluminum oxide and tantalum oxide when finely ground, formed into bodies and sintered at high temperatures are converted into a non-porous ceramic product of such dense and compact structure as to result in an improvement in certain desirable physical characteristics, such as mechanical strength, thermal efficiency, electrical resistance at elevated temperatures, and resistance to heat shock. When alumina recrystallizes it has a tendency to contain gas vesicles or blebs, especially in the center of the individual crystals, even though it has been completely melted and allowed to crystallize from the molten state. The lower the temperature at which this recrystallization takes place, the greater the number of vesicles. Normally corundum crystals are nearly opaque as a result of this condition. The physical properties of completely clear crystals vary rather widely from those of the highly vesicular crystals which contain an appreciable volume of voids. We have found it possible to reduce these vesicles and to obtain homogeneous crystals by the addition of tantalum oxide to alumina. Further, the addition of this material induces formation of this denser and more compact structure at greatly reduced temperatures, which is economically highly desirable.

Study of our improved bodies indicates that tantalum oxide forms eutectics with alumina. The final product is a mechanical mixture of the original components, i. e., the added component does not enter the lattice structure of the corundum and the physical properties are the resultant of the physical properties of the crystal phases which compose the mixture. As tantalum oxide is added to alumina in increasing quantities the properties of the insulator become more like those of tantala and less like those of alumina, always, of course, taking into account the effects each component has on the crystal habit of the other, these effects in the case of tantala including the important one previously mentioned of increasing the density of the alumina crystals.

Best results have been obtained with a tantalum oxide content of from .5% to 30%. Such bodies are characterized by unusually high thermal efficiency. We have also been successful in making good bodies with a preponderance of tantalum oxide, for example as much as 80%. However, for commercial production a tantalum oxide content of about 3% will probably be found most satisfactory, thereby obtaining substantial improvement at low cost.

The improved insulators are characterized by high thermal efficiency, good thermal shock resistance and high mechanical strength. They possess satisfactory electrical resistance at high temperature and altogether possess the qualities necessary for successful operation under severe operating conditions, particularly those encountered in modern high compression engines.

The improved insulators are manufactured by first grinding and thoroughly mixing the ingredients. The grinding is preferably carried to a point where all of the material is in the form of a fine powder capable of passing through screens of 325 mesh to the linear inch. The ingredients should be substantially free from alkali because of the deleterious effect of the latter on the electrical properties of the insulator. The insulators may be molded into shape with the aid of a suitable binding agent by the process described and claimed in Patent No. 2,122,960 granted to Karl Schwartzwalder on July 5, 1938; by pressing in rubber molds as described in Patent No. 2,091,973 granted to Albra H. Fessler and Ralston Russel, Jr., on September 7, 1937; by casting, or by any other of the known methods used in forming bodies from non-plastic materials. The first mentioned method has been found to be preferable because the resulting insulator usually possesses a smooth, glossy surface requiring no glaze.

The formed bodies are then fired to a suitable temperature to produce recrystallization, and this is usually accompanied by considerable shrinkage. The firing time and temperature must be controlled as in usual kiln practice so as to secure complete recrystallization and to avoid overfiring with resultant warpage or other injury to the product. Firing temperatures on the order of Orton Cone 30 (1650° C.) will be found satisfactory.

It may, in some instances, prove desirable to add to the composition small proportions, for example up to 5%, of a suitable flux such as talc or fluorspar to reduce the firing temperature. It may also prove desirable to add proportions of other eutectic forming materials such as cerium oxide, monazite sand, zirconium oxide or thorium oxide; or proportions of inorganic compounds forming solid solutions with alumina such as those described in copending applications Serial Nos. 134,124 and 134,125, filed by Taine G. McDougal, Albra H. Fessler and Karl Schwartzwalder on March 31, 1937; or proportions of inorganic materials forming compounds with alumina as described and claimed in Patent No. 2,120,338 granted to the same inventors on June 14, 1938.

We claim:

1. A spark plug insulator in the form of a dense, nonporous body consisting of a sintered mixture of corundum and from .5% to 80% tantalum oxide.

2. A spark plug insulator in the form of a dense, nonporous body consisting of a sintered mixture of corundum and from 5% to 30% tantalum oxide.

TAINE G. McDOUGAL.
ALBRA H. FESSLER.
HELEN BLAIR BARLETT.